United States Patent
Gorokhov

(10) Patent No.: US 7,397,826 B2
(45) Date of Patent: Jul. 8, 2008

(54) MIMO TRANSMISSION SYSTEM IN A RADIO COMMUNICATIONS NETWORK

(75) Inventor: Alexei Gorokhov, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 859 days.

(21) Appl. No.: 10/480,349

(22) PCT Filed: Jun. 14, 2002

(86) PCT No.: PCT/IB02/02290

§ 371 (c)(1),
(2), (4) Date: Dec. 9, 2003

(87) PCT Pub. No.: WO03/001726

PCT Pub. Date: Jan. 3, 2003

(65) Prior Publication Data

US 2004/0170430 A1    Sep. 2, 2004

(30) Foreign Application Priority Data

Jun. 21, 2001 (EP) ................. 01202358

(51) Int. Cl.
*H04J 3/04* (2006.01)
(52) U.S. Cl. ..................... 370/536; 375/260
(58) Field of Classification Search ............ 370/536
See application file for complete search history.

(56) References Cited

U.S. PATENT DOCUMENTS 6,771,706 B2 *  8/2004  Ling et al. ............... 375/267
6,891,897 B1 *  5/2005  Bevan et al. ............. 375/265
6,954,655 B2 * 10/2005  Rudrapatna et al. ...... 455/562.1

(Continued)

FOREIGN PATENT DOCUMENTS

EP    0951091 A2    10/1999

OTHER PUBLICATIONS

Gorokhov, Alexei, "Bit Sharing for Layered Space-Time Architectures With Ordered Signal Retrieval", Nov. 2003, IEEE Transactions on Communications, vol. 51, No. 11, entire document.*

*Primary Examiner*—Chau Nguyen
*Assistant Examiner*—Suk Jin Kang
(74) *Attorney, Agent, or Firm*—Larry Liberchuk

(57) ABSTRACT

Described is a transmission system (10) for transmitting an information signal (21) via a plurality of subchannels from a transmitter (12) to a receiver (16). The transmitter (12) comprises a demultiplexer (20) for demultiplexing the information signal (21) into a plurality of information subsignals (23). The transmitter (12) further comprises a channel encoder (8) for encoding the information subsignals (23) into encoded information subsignals (25). Each encoded information subsignal (25) is transmitted via one of the subchannels to the receiver (16). The receiver (16) comprises a channel decoder for successively decoding the received encoded information subsignals. The transmission system (10) is characterized in that the demultiplexer (20) is arranged for demultiplexing the information signal (21) into a plurality of partly overlapping information subsignals (23) comprising shared and non-shared information elements. For each subsignal (23) a distribution of the shared information elements is adapted to the throughput of the subchannels as ordered by the receiver (16). The channel decoder is arranged for decoding a received encoded information subsignal by incorporating shared information elements of already decoded information subsignals. In this way, the transmission system can achieve a maximum througput.

20 Claims, 10 Drawing Sheets

U.S. PATENT DOCUMENTS

Figure 1:
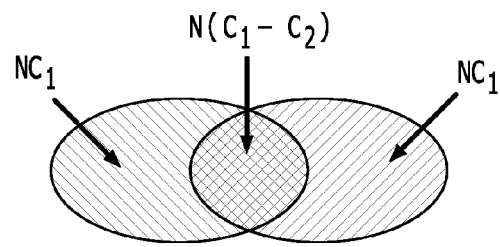

| | | | |
|---|---|---|---|
| 6,961,388 B2 * | 11/2005 | Ling et al. | 375/267 |
| 7,050,510 B2 * | 5/2006 | Foschini et al. | 375/299 |
| 7,095,996 B2 * | 8/2006 | Tamaki et al. | 455/296 |
| 7,154,936 B2 * | 12/2006 | Bjerke et al. | 375/148 |
| 7,233,626 B2 * | 6/2007 | Jin | 375/265 |
| 2002/0118126 A1 * | 8/2002 | Cornelius et al. | 341/96 |
| 2003/0125040 A1 * | 7/2003 | Walton et al. | 455/454 |

* cited by examiner

MIMO TRANSMISSION SYSTEM IN A RADIO COMMUNICATIONS NETWORK

The invention relates to a transmission system for transmitting an information signal via a plurality of subchannels from a transmitter to a receiver, the transmitter comprising a demultiplexer for demultiplexing the information signal into a plurality of information subsignals, the transmitter further comprising a channel encoder for encoding the information subsignals into encoded information subsignals, wherein each encoded information subsignal is transmitted via one of the subchannels to the receiver, the receiver comprising a channel decoder for successively decoding the received encoded information subsignals.

The invention further relates to a transmitter for transmitting an information signal via a plurality of subchannels to a receiver, to a receiver for receiving encoded information subsignals via a plurality of subchannels from a transmitter, to a method of transmitting an information signal via a plurality of subchannels to a receiver and to a method of receiving encoded information subsignals via a plurality of subchannels from a transmitter.

Such a transmission system is known from European Patent Application EP 0 951 091 A2. In this known transmission system multiple transmit antennas are used to transmit streams of coded symbols (i.e. the encoded information subsignals) that originate from the same data source (i.e. the information signal). At the receiver, these multiple streams are received by means of multiple receive antennas and decoded successively by removing the data streams that have been decoded at earlier stages and by cancelling the remaining data streams, due to the multiple receive antennas, via spatial (space-time or space-frequency) interference cancellation. Such a scheme is often referred to as an ordered successive interference cancellation (OSIC) scheme.

The capacity (throughput) of the known transmission system is limited.

It is an object of the invention to provide a transmission system according to the preamble having a higher transmission capacity than the known transmission system. This object is achieved in the transmission system according to the invention, said transmission system being characterized in that the demultiplexer is arranged for demultiplexing the information signal into a plurality of partly overlapping information subsignals comprising shared and non-shared information elements, wherein for each subsignal a distribution of the shared information elements is adapted to the throughput of the subchannels as ordered by the receiver, the channel decoder being arranged for decoding a received encoded information subsignal by incorporating shared information elements of already decoded information subsignals. Consider a setup of the known transmission system with two subchannels. Assume that two data streams are transmitted over two subchannels with the respective capacities $C_1$ and $C_2$ (measured in user bits or information bits per channel use), and these capacities $C_1$ and $C_2$ are known to the transmitter. Assume, however, that the association between the transmitted streams and the subchannel is unknown to the transmitter. At the receiver, the data streams may be decoded successively in an arbitrary order, but not simultaneously. Clearly, the maximum achievable capacity of the known system is upper bounded by $(C_1+C_2)$. A straightforward approach is to use two independent sets of user bits to encode both data streams. Since the association between the data streams and the subchannels is unknown to the transmitter, the bit rate of each data stream is limited by the minimum of the capacities: $\min(C_1, C_2)$. If a higher bit rate were to be used, one would risk loosing data. The maximum cumulative bit rate over two subchannels is therefore $2 \min(C_1, C_2)$. This rate is smaller than the upper bound $(C_1+C_2)$ by a factor of $|C_1-C_2|$.

Assume, without loss of generality, that $C_1 \geq C_2$. The invention is based upon the recognition that the full capacity $(C_1+C_2)$ can be reached by encoding the data streams with two intersecting sets of user bits of equal size. Specifically, the numbers of independent bits (non-shared information elements) and common bits (shared information elements) within each stream can be selected so that both streams have an equal bit rate $C_1$ whereas the conditional bit rate of a first stream given the second stream (i.e. only the independent/unknown bits of the first stream) is equal to $C_2$. In other words, the total number of user bits encoding a data block for each stream is $NC_1$ and the number of common bits within the two blocks is $N(C_1-C_2)$, where N is the number of channel uses (or signal dimensions) involved. This principle is illustrated in FIG. 1 where the sets of user bits encoding two data streams are depicted by two ovals. Each set of user bits defines a codeword of N channel symbols, from a code that matches the channel properties. For instance, a Gaussian code should be (ideally) used for an additive white Gaussian noise (AWGN) channel. Note that the total number of user bits transmitted over two subchannels is $N(C_1+C_2)$, hence the overall bit rate is $(C_1+C_2)$.

At the receiver, these data streams are decoded successively, starting with the best subchannel, in our example, the subchannel with capacity $C_1$. Clearly, decoding of the best subchannel yields all $NC_1$ user bits. Due to the intersection between the two sets of user bits, the remaining number of unknown user bits of the second (worst) subchannel is $NC_2$. Hence the conditional bit rate over the second subchannel, after the decoding of the first subchannel, is $C_2$. Since this rate is equal to the capacity of the second subchannel, the remaining $NC_2$ user bits of the second data stream can be decoded.

In an embodiment of the transmission system according to the invention the demultiplexer is arranged for demultiplexing the information signal into the plurality of partly overlapping information subsignals according to the user bit partitioning algorithm. This algorithm ensures that the conditional rates of the subsequently decoded subsignals, given the previously decoded subsignals, are matched to the throughputs of subchannels as ordered by the receiver.

In another embodiment of the transmission system according to the invention the transmitter further comprises an interleaver coupled between the demultiplexer and the channel encoder, the interleaver being arranged for interleaving the information subsignals, wherein the channel encoder is arranged for encoding the interleaved information subsignals into the encoded information subsignals. This interleaver is meant to homogeneously spread the shared information elements within the stream of all input information elements, so as to efficiently use the shared information elements known from the previously decoded streams for the decoding of the current stream.

In a further embodiment of the transmission system according to the invention the channel decoder is arranged for decoding a received encoded information subsignal by incorporating shared information elements of the most recently decoded information subsignal. In such a case, the most recent update on a shared information element may incorporate all the available estimates (realiability measures) on the information elements shared through the previously decoded substreams, thereby providing the highest reliabilities of these information elements.

Figure 2:
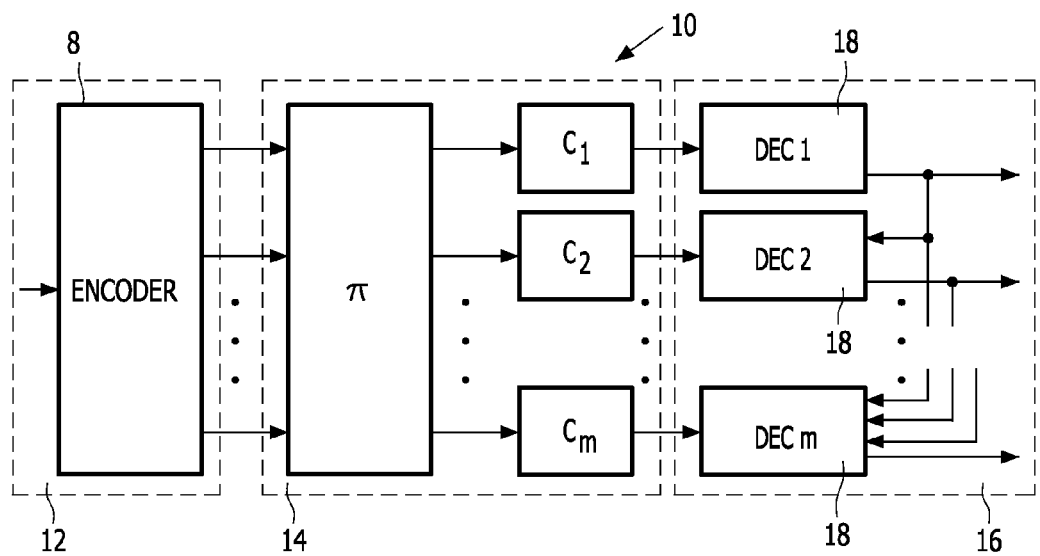
Figure 3:
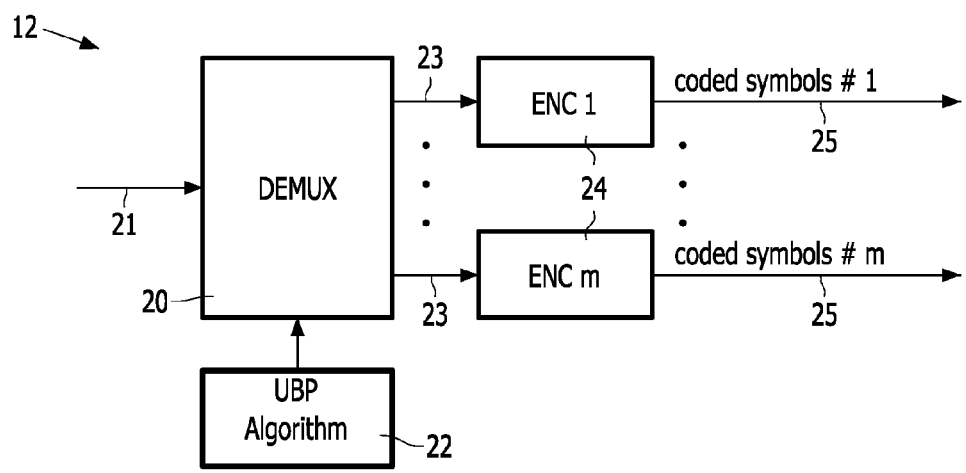
Figure 4:
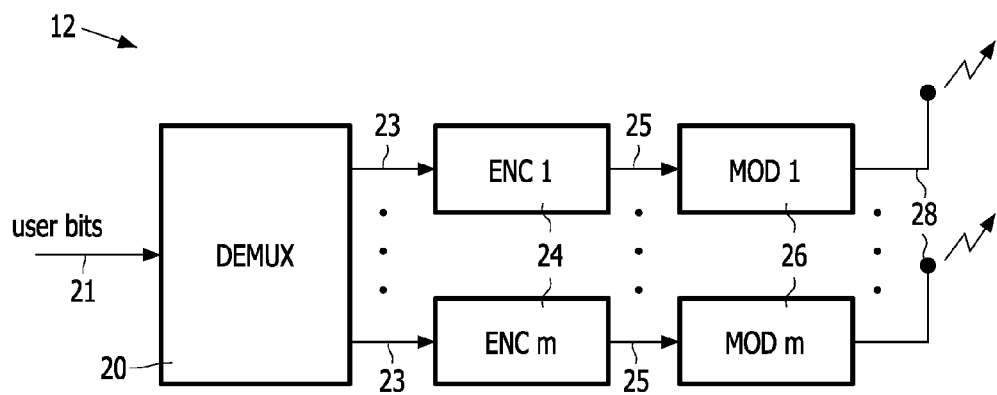
Figure 5:
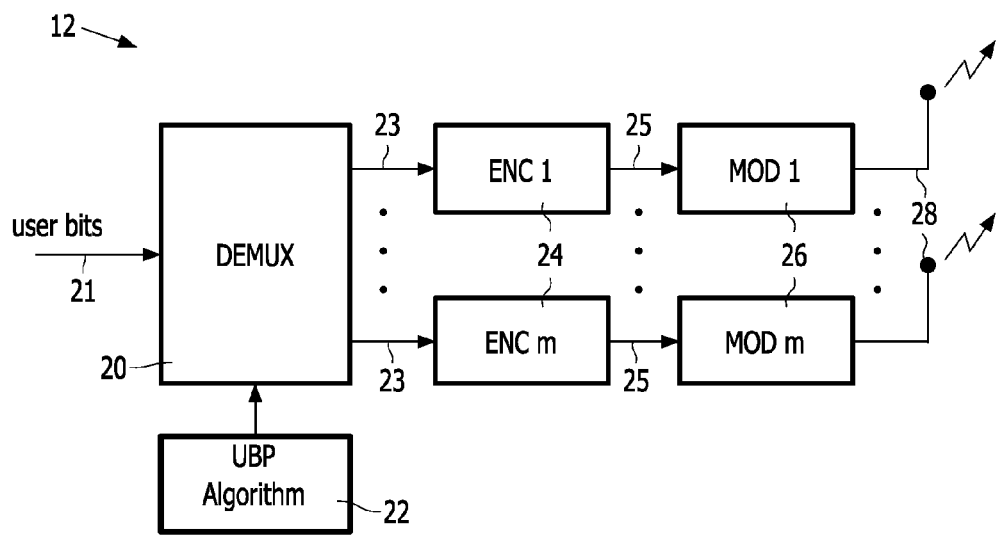
Figure 6:
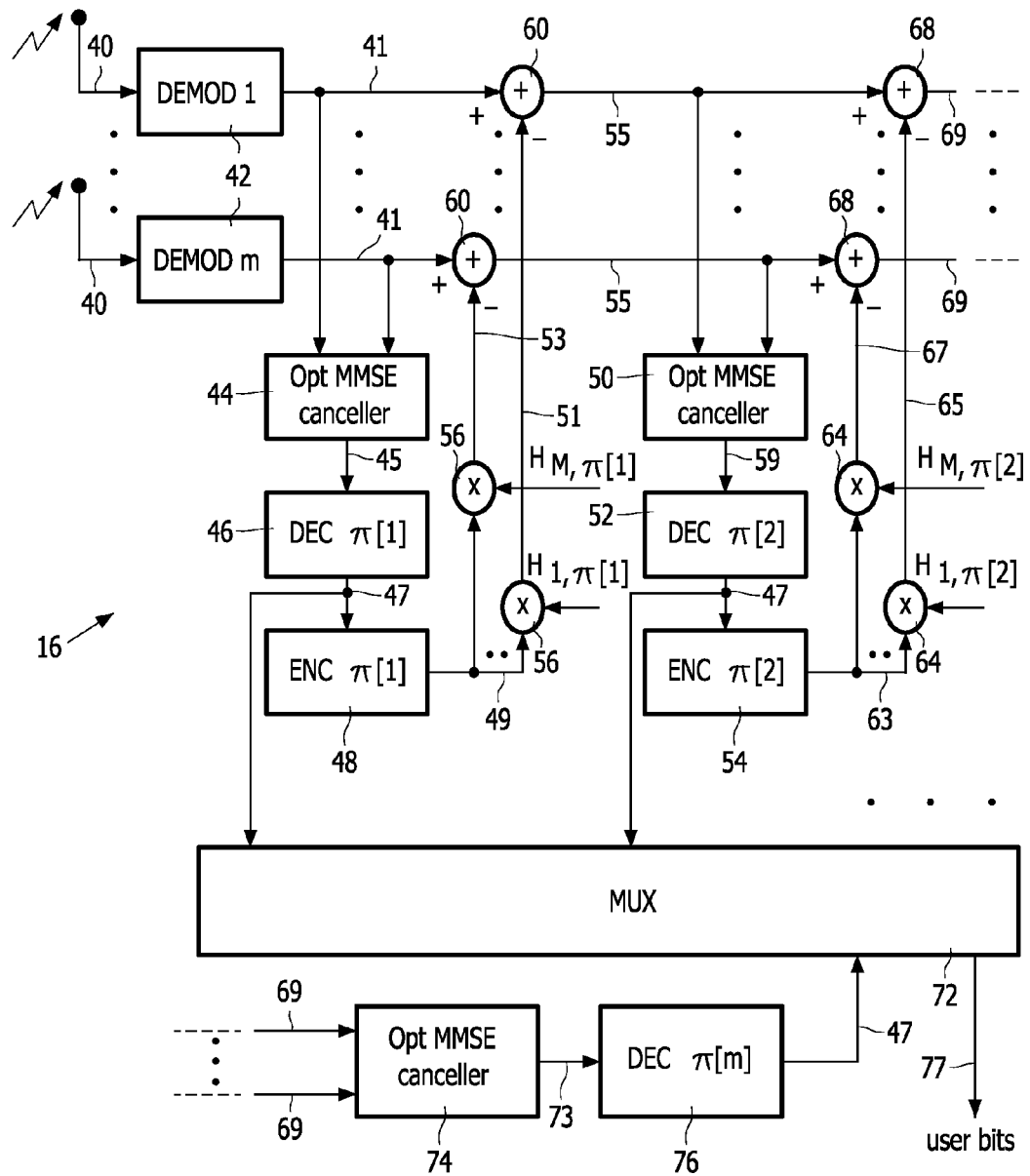
Figure 7:
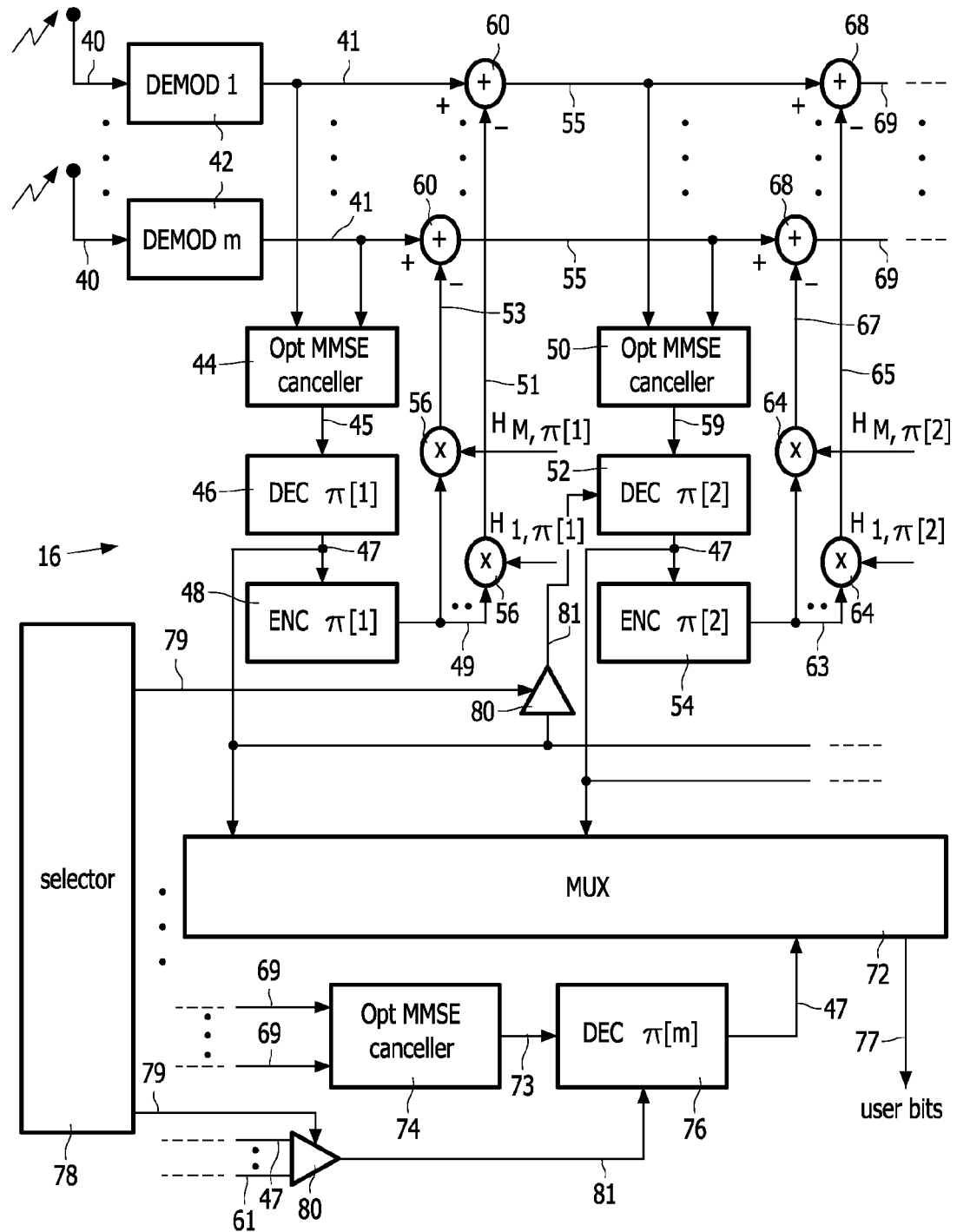
Figure 8:
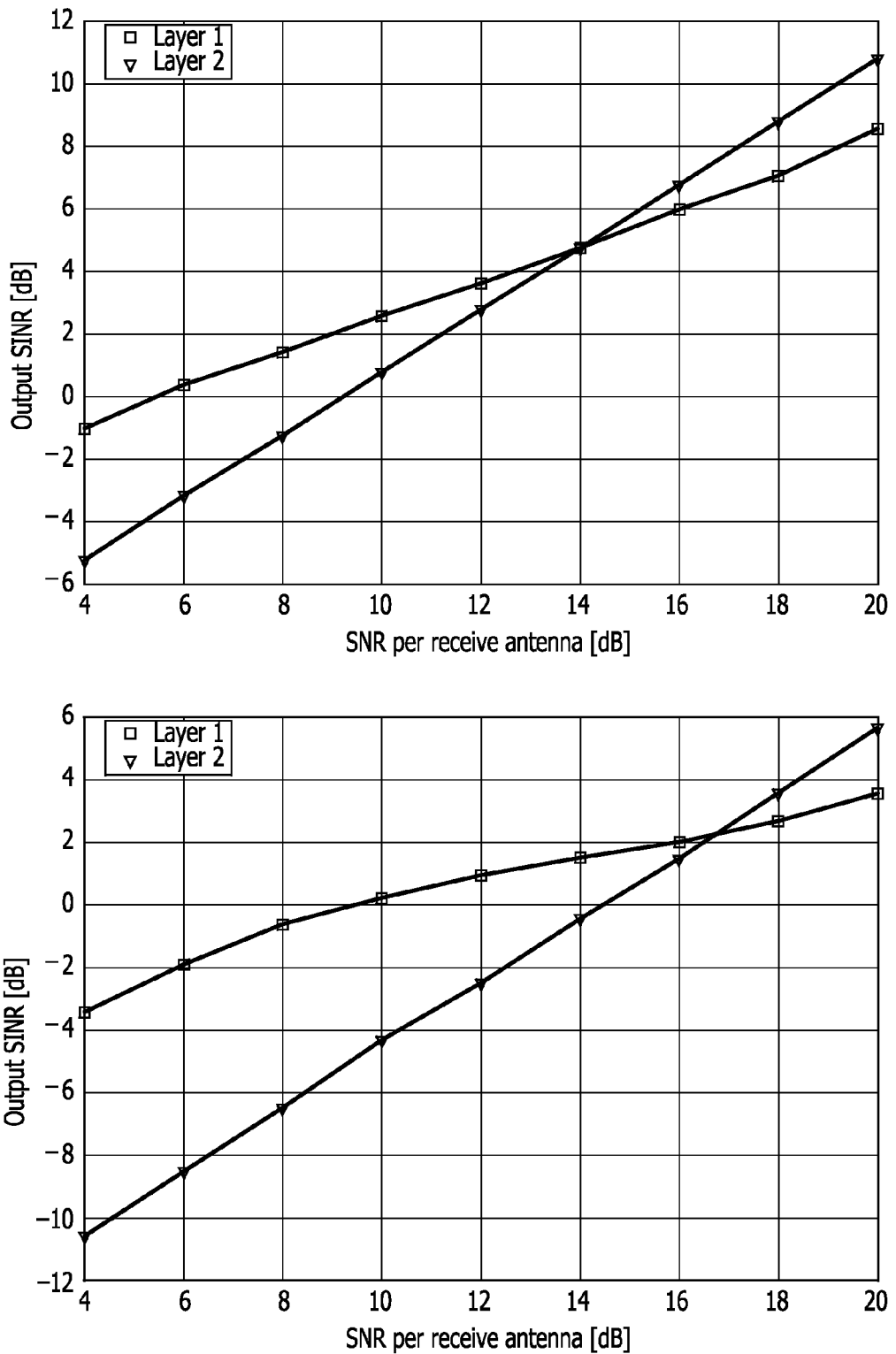

The above object and features of the present invention will be more apparent from the following description of the preferred embodiments with reference to the drawings, wherein:

FIG. 1 shows a diagram of two intersecting sets of user bits which illustrate the concept of partly overlapping information subsignals 23, FIG. 2 shows a block diagram of a transmission system 10 according to the invention, FIGS. 3 and 5 show block diagrams of embodiments of a transmitter 12 according to the invention, FIG. 4 shows a block diagram of a prior art transmitter 12, FIG. 6 shows a block diagram of a prior art wireless receiver 16, FIG. 7 shows a block diagram of an embodiment of a receiver 16 according to the invention, FIGS. 8 to 13 show some graphs illustrating the performance of a transmission system 10 according to the invention.

In the Figures, identical parts are provided with the same reference numbers.

This invention relates to a transmission system 10 as shown in FIG. 2 which transmission system 10 makes use of multiple subchannels to deliver information from a transmitter 12 to a receiver 16. The signals from different subchannels are decoded successively. The order of decoding is defined at the receiver 16 and is unknown to the transmitter 12. It is assumed that the transmitter 12 is aware of the ordering principle and of some properties of the ordered sequence of subchannels such as statistics (e.g. Rayleigh fading) of the capacities (maximum throughputs) of the ordered subchannels. Alternatively, the transmitter 12 may be aware of the signal to noise (and interference) ratio (SNR/SINR) of the ordered subchannels. However, the order of decoding for each realisation of subchannels is random, as seen by the transmitter 12. The present invention is related to a channel coding strategy that makes use of the known properties of the subchannels to enhance the performance of such a multi-channel transmission system 10. This channel coding strategy comprises an encoder and a decoder architecture. The general coding strategy is further applied to enhance the performance of wireless transmission systems that make use of multiple transmit antennas to transmit multiple parallel data streams and multiple receive antennas with an ordered extraction of the transmitted streams at the receiver known as ordered successive interference cancellation (OSIC).

First, we explain the basic idea of the proposed channel coding strategy. To this end, consider a setup with two subchannels. Assume that two data streams are transmitted over two subchannels with the respective capacities $C_1$ and $C_2$ (measured in user bits or information bits per channel use), and these capacities $C_1$ and $C_2$ are known to the transmitter 12. Assume, however, that the association between the transmitted streams and the subchannel is unknown to the transmitter 12. At the receiver 16, the data streams may be decoded successively in an arbitrary order, but not simultaneously. Clearly, the maximum achievable capacity of such a system is upper bounded by $(C_1+C_2)$. A straightforward approach is to use two independent sets of user bits to encode both data streams. Since the association between the data streams and the subchannels is unknown to the transmitter 12, the bit rate of each data stream is limited by the minimum of the capacities: $\min(C_1, C_2)$. If a higher bit rate were to be used, one would risk loosing data. The maximum cumulative bit rate over two subchannels is therefore $2\min(C_1, C_2)$. This rate is smaller than the upper bound $(C_1+C_2)$ by a factor of $|C_1-C_2|$. The channel coding strategy described below allows for the full capacity $(C_1+C_2)$ to be utilized.

Assume, without loss of generality, that $C_1 \geq C_2$. The data streams may be encoded with two intersecting sets of user bits of equal size. Specifically, we select the numbers of independent bits (non-shared information elements) and common bits (shared information elements) within each stream so that both streams have an equal bit rate $C_1$ whereas the conditional bit rate of a first stream given the second stream (i.e. only the independent/unknown bits of the first stream) is equal to $C_2$. In other words, the total number of user bits encoding a data block for each stream is $NC_1$ and the number of common bits within the two blocks is $N(C_1-C_2)$, where N is the number of channel uses (or signal dimensions) involved. This principle is illustrated in FIG. 1 where the sets of user bits encoding two data streams are depicted by two ovals. Each set of user bits defines a codeword of N channel symbols, from a code that matches the channel properties. For instance, a Gaussian code should be (ideally) used for an additive white Gaussian noise (AWGN) channel. Note that the total number of user bits transmitted over two subchannels is $N(C_1+C_2)$, hence the overall bit rate is $(C_1+C_2)$.

At the receiver 16, these data streams are decoded successively, starting with the best subchannel, in our example, the subchannel with capacity $C_1$. Clearly, decoding of the best subchannel yields all $NC_1$ user bits. Due to the intersection between the two sets of user bits, the remaining number of unknown user bits of the second (worst) subchannel is $NC_2$. Hence the conditional bit rate over the second subchannel, after the decoding of the first subchannel, is $C_2$. Since this rate is equal to the capacity of the second subchannel, the remaining $NC_2$ user bits of the second data stream can be decoded.

The general case of a transmission system 10 with an arbitrary number m of subchannels, ordered successive decoding of the corresponding data streams at the receiver 16 and a known sequence of ordered capacities is illustrated by a block diagram in FIG. 2. According to this FIG. 2, the set of user bits is encoded by a channel encoder 8 into m parallel streams that are transmitted over an m input m output channel 14. This channel 14 is represented by a permutation $\pi$ of the m transmitted streams followed by m parallel subchannels with the respective capacities $C_1 \ldots C_m$. The set of capacities is known to the receiver 16 and to the transmitter 12 whereas the permutation $\pi$ is known to the receiver 16 only. The transmitter 12 treats $\pi$ as a random permutation (specifically, $\pi$ is assumed uniformly distributed over the set of m possible permutations). Without loss of generality, we may assume that received streams are ordered so that $C_1 \geq \ldots \geq C_m$. At the receiver 16, these streams are decoded successively by m decoders 18 so that the n-th decoder 18 makes use of the knowledge of the user bits recovered by the previous (n−1) decoders 18, $1 < n \leq m$. The m decoders 18 and their interconnections form a channel decoder.

In what follows, we describe the encoding/decoding strategy for the multiple input multiple output (MIMO) channel 14 in FIG. 2 and specify the maximum throughput achievable with this strategy. To specify the capacity of this channel 14, we need to define a finite difference operator $\nabla(\{S_k\}_{1 \leq k \leq m}, n)$ of order $0 \leq n < m$ applied to a sequence $\{S_k\}_{1 \leq k \leq m}$ of real values:

$$\nabla(\{S_k\}_{1 \leq k \leq m}, 0) = \{S_k\}_{1 \leq k \leq m}, \nabla(\{S_k\}_{1 \leq k \leq m}, 1) = \{S_k - S_{k+1}\}_{1 \leq k \leq m}, \nabla(\{S_k\}_{1 \leq k \leq m}, n+1) = \nabla(\nabla(\{S_k\}_{1 \leq k \leq m}, n), 1), 0 \leq n < m. \quad (1)$$

The capacity $C_\Sigma$ achievable with the proposed channel coding strategy is equal to the maximum of the sum of positive values $\underline{C}_1 \ldots \underline{C}_m$ that satisfy two conditions, namely $\underline{C}_k \leq C_k$, $1 \leq k \leq m$ and $\nabla(\{\underline{C}_k\}_{1 \leq k \leq m}, n) \geq 0$, $0 \leq n < m$. In other terms, $$C_\Sigma = \max(\underline{C}_1 + \ldots + \underline{C}_m : \underline{C}_k \leq C_k, 1 \leq k \leq m, \nabla(\{\underline{C}_k\}_{1 \leq k \leq m}, n) \geq 0, 0 \leq n < m). \quad (2)$$

The channel coding strategy explained above for m=2 extends to an arbitrary m. As a first step, we specify a set $\underline{C}_1 \ldots \underline{C}_m$ that satisfies the two aforementioned conditions with the maximum possible sum $(\underline{C}_1 + \ldots + \underline{C}_m)$. This problem can be solved by standard linear programming. For a given set of capacities $\underline{C}_1 \ldots \underline{C}_m$ and the number of channel uses N, we specify m intersecting sets of information bits, $I_1 \ldots I_m$, to be transmitted over m subchannels, according to the user bit partitioning (UBP) algorithm specified below. In the description of this algorithm and later throughout the document, we will make use of the following notations:

---

User bit partitioning algorithm

Compute a set $D_1 \ldots D_m$ of non-negative integers: $D_n = \lfloor \nabla(\{N\underline{C}_k\}_{1 \leq k \leq n}, n-1) \rfloor$, $1 \leq n \leq m$.
Choose $I_1$ as an arbitrary set of user bits of size $|I_1| = D_1$.
    for n = 1 to (m − 1)
        choose a set $A^{(n,0)} \subset \cap_{1 \leq l \leq n} I_l$ such that $|A^{(n,0)}| = D_n$;
        initialise $I_{n+1} := A^{(n,0)}$;
        for p = 1 to (n − 1)
            for all p-tuples $\{l_1, \ldots, l_p\} \subset \{1, \ldots, n\}$
                choose a set $A_{l_1,\ldots,l_p}^{(n,p)} \subset (\cap_{l \in \{l_1,\ldots,l_p\}} I_l \cap_{l \in \overline{\{l_1,\ldots,l_p\}}} \overline{I_l})$
                such that $|A_{l_1,\ldots,l_p}^{(n,p)}| = \nabla(\{D_l\}_{n-p+1 \leq l \leq n+1}, p)$;
                update $I_{n+1} := I_{n+1} \cup A_{l_1,\ldots,l_p}^{(n,p)}$;
        end
    end
    choose an arbitrary set $A^{(n,n)}$ such that $A^{(n,n)} \cap (\cup_{1 \leq l \leq n} I_l) = \emptyset$
    and $|A^{(n,n)}| = \nabla(\{D_l\}_{1 \leq l \leq n+1}, n)$.
    update $I_{n+1} := I_{n+1} \cup A^{(n,n)}$;
end

---

$|\cdot|$—size of the set (number of bits within the set);
$\lfloor \cdot \rfloor$—lower integer bound of a non-negative value;
$\cap$—intersection of sets;
$\cup$—union of sets;
$\subset$—inclusion relation;
$\overline{(\cdot)}$—complementary part of the set $(\cdot)$ e.g. elements that are not in $(\cdot)$;
$\overline{\{l_1,\ldots,l_p\}}$—complement of the subset $\{l_1, \ldots, l_p\} \subset \{1, \ldots, n\}$ to $\{1, \ldots, n\}$ Each set $I_k$ may be interpreted as a set of indexes of the user bits within the data block that are transmitted over the k-th subchannel, $1 \leq k \leq m$. Hence, the sets $I_1 \ldots I_m$ may be specified off-line, given the set of capacities $C_1 \ldots C_m$ that characterise the MIMO channel 14. A general block diagram of the transmitter 12 is shown in FIG. 3. First, the data block to be transmitted (i.e. the user bits of the information signal 21) is partitioned/demultiplexed by a demultiplexer 20 into m streams/information subsignals 23, according to the UBP algorithm 22. As a matter of fact, each of these streams 23 contains $D_1$ user bits and any n streams share $D_n$ user bits, $1 < n \leq m$. These m streams 23 may be further encoded into sequences of channel symbols 25 with identical codes by m encoders 24; these codes should be adapted to the channel properties. The m encoders 24 form the channel encoder 8. At the receiver 16, the encoded sequences of symbols 25 (or encoded information subsignals 25) are ordered according to the capacities $C_1 \ldots C_m$ and are decoded subsequently, as indicated in FIG. 2. Here all m decoders 18 may have identical structures. Furthermore, the decoder 18 of the n-th stream makes use of the known $D_n$ user bits from the n-th input stream that are shared with previous (n−1) streams, $1 < n \leq m$.

It can be proved that such a scheme with optimally chosen codes and proper decoding algorithms has a potential to reach the capacity $C_\Sigma$ specified in (2). The choice of encoder/decoder for each data stream deserves a particular attention. Random codes with maximum likelihood (ML) decoding at the receiver imply the maximum throughput. However, the encoding and decoding is not feasible for these codes. Practical choice of codes and corresponding decoding algorithms depend on the desirable performance characteristics (bit and frame error rates) and complexity/storage limitations. In many cases, each subchannel appears to be a scalar channel with well-understood properties, thereby giving rise to the standard channel codes. Some examples of practical interest will now be discussed.

First, a transmission system having MIMO fading channels with additive Gaussian noise will be discussed. In this context it is assumed that the signal at the output of each subchannel is given by a linear combination of the symbols transmitted in all subchannels and an additive Gaussian noise. In such scenarios, with an appropriate processing at the receiver 16, each subchannel may be regarded as a scalar channel corrupted by a residual inter-subchannel interference and additive Gaussian noise. The commonly used coding strategy consists of a bit-space encoding (FEC encoder), mapping the coded bits into channel symbols and putting these symbols into channel (modulation). The last step depends on the channel properties. Usually, modulation is accomplished in time domain (single carrier systems) or frequency domain (multicarrier systems). In both cases, spreading may be applied so that several channel symbols share several channel uses in time or frequency domain (giving rise to direct sequence or multicarrier spread spectrum transmission, respectively). The choice of channel symbol alphabet (signalling) depends on the desired spectral efficiency and FEC rate. The commonly used signalling schemes are: BPSK, QPSK, 8-PSK and $2^k$-QAM with $k \geq 2$. Note that the proposed encoding strategy may be applied for such MIMO fading channels. To this end, one has to specify the set of capacities $C_1 \ldots C_m$ which are characterised by the signal to interference plus noise ratios (SINR) within the respective subchannels. In the case of fading channels, the SINR may be unknown to the transmitter 12. The standard approach is to use outage values of SINR that are chosen, according to the expected statistical properties of the fading, as a lower bound on the actual unknown SINR for all but a small subset of outage channels. Note that the outage value of SINR/capacity/etc. is the value of SINR/capactity/etc. for which the outage rate is equal to a certain percentage of the cases/time when the actual SINR/capactity/etc. of the system is worse than the outage value.

The FEC coding strategies commonly used for channels with Gaussian noise are the standard convolutional codes and, since recently, parallel and serial concatenated interleaved (turbo) codes and low density parity check (LDPC) codes. Although all these codes may be incorporated within the encoders 24 in FIG. 3, the efficiency of our approach may depend on the properties of the chosen FEC code. Indeed, the error correction capability of the known user bits at the input of the FEC encoders 24 depends on the span of typical error patterns that involve the known bits. In the case of random-like codes, such as LDPC and turbo codes, typical error patterns span a substantial part of the coded bits. Therefore, every known bit at the input of the encoders 24 is expected to have a global error correction effect over the whole code (unlike a local effect in the case of convolutional codes). It is, therefore, expected that the use of turbo codes, LDPC or similar codes FEC codes will be particularly beneficial for the general MIMO encoding scheme disclosed in this document. For such FEC codes, those user bits at the input of the n-th encoder 24 which also contribute to the inputs of some other encoders 24, may be homogeneously distributed within the stream of user bits at the input of the n-encoder 24, $1 \leq n \leq m$. Such a distribution may be achieved by an interleaver (not shown) coupled between the demultiplexer 20 and the channel encoder 8 and which interleaver performs a pseudo-random (uniform) or equidistant interleaving of each stream of user bits 23 at the output of the demultiplexer 20, prior to the FEC encoding (e.g. by turbo or LDPC codes), see FIG. 3. The interleaver may be further optimised subject to a chosen FEC code.

The general decoding scheme is depicted in the receiver 16 of FIG. 2. It implies that at the n-th decoding stage, the n-th decoder 18 makes use of the known input bits that are shared with codes decoded at the previous (n−1) stages. A practical implementation of this idea depends on the type of code and the corresponding decoding procedure. Here we distinguish between soft and hard decision decoders. In hard decision decoding, a FEC decoder generates binary decisions on the input user bits. These decisions on shared bits (information elements) are used, at the subsequent decoding stages, to limit the choice of possible codewords.

Example: for convolutional codes, binary decisions on the input bits usually result from a ML sequence detection by Viterbi algorithm. The decisions on the shared bits are then incorporated in the Viterbi algorithm of the successive decoding stages so that, at every trellis section associated to the previously decoded shared bit, only those state transitions are considered that correspond to the decoded binary value (thereby reducing the total number of possible transitions by 2 if the conventional Viterbi algorithm is applied).

In soft decision decoding, a FEC decoder generates (soft) real-valued metrics that represent reliability measures of the input bits. Usually, each soft metric is (an approximate) log-likelihood ratio, i.e. the logarithm of the ratio of a posteriori probability of an input bit being 0 versus a posteriori probability of this bit being 1, given the observed signal. Soft metrics are often involved in decoding procedures of concatenated codes and iterative decoding algorithms. The final decision on the input bit is taken according to the sign of such soft metrics. Whenever soft decisions on the input bits are available, the use of soft metrics on the shared bits at the subsequent decoding stages, instead of binary decisions (or equivalently, very big soft values) ensures generally a better performance.

Example: soft decision decoding is commonly used to iteratively decode turbo codes and LDPC codes. For turbo codes, the soft metrics of the input bits are produced by soft input soft output (SISO) decoders of components codes. For LDPC codes, the soft metrics result from the so-called message passing decoding algorithm. Whenever such FEC codes are used within the MIMO encoding scheme disclosed in this document, the soft metrics of the shared bits, obtained at the last iteration of the current stage, are transferred to the subsequent decoding stages. At the subsequent stages, the so-obtained soft metrics should be used as a priori metrics on the shared bits or added to the existing a priori metrics if the latter are available at these decoding stages.

Finally, at every decoding stage, whenever a given input bit is shared with more than one of previous stages, the decoder preferably makes use of (either hard or soft) decisions that come from the most recent previous decoding, i.e. the channel decoder is preferably arranged for decoding a received encoded information subsignal by incorporating shared information elements of the most recently decoded information subsignal.

Iterative decoding may be applied to improve the performance of the proposed MIMO scheme. Iterative decoding of the scheme in FIG. 2 means repeating the whole or any part of the full decoding cycle which consists of the successive decoding of m subchannels as described above. In this case, the early decoding stages can make use of hard/soft information on the shared bits obtained at the subsequent stages during the previous iterations. In the case of soft decision decoding, the reliability values to be used at other stages should be computed according to the standard rules for extrinsic information, similarly to turbo decoding, in order to avoid double-counting of the same information.

The same channel coding principle may be applied to a binary MIMO transmission channel. A possible scenario is transmission of binary messages (data packets) in a network from a transmitter to a receiver via multiple routes (subchannels). Assume that exact reliabilities of different paths (crossover probabilities of the equivalent binary symmetric channels) are not known to the transmitter but the statistical properties (a distribution law of the crossover probability) are known, e.g. from modelling results. One way to deal with the uncertainty of reliabilities per subchannel is to decode these streams in such an order that the reliabilities of the ordered subchannels form a non-increasing sequence. As a matter of fact, variations of each element of an ordered sequence of independent identically distributed random values go to zero as the sequence length goes to infinity. Hence, one can accurately adapt transmission rates to the (quasi-deterministic) throughputs of the ordered subchannels provided that their number is big enough. Although the throughputs of the ordered subchannels may be assumed accurately known at the transmitter, the order of the extraction of the transmitted streams is unknown (unless a feedback channel between the transmitter and the receiver is used to convey channel information). In such a case, the overall MIMO channel falls under the scope of the general scheme of FIG. 2. Further implementations may be based on the available FEC schemes for binary symmetric channels (i.e. with MDS codes). Yet, it is desirable to adapt the existing coding schemes so as to emphasize the benefit of a partial knowledge of the input bits, according to the channel coding strategy proposed in this document.

The channel coding strategy described above may also be applied to increase the throughput of wireless communication systems that exploit multiple transmit and receive antennas. In such systems, multiple transmit antennas 28 are used to transmit streams of coded symbols that originate from the same data source. At the receiver side, these multiple streams are retrieved and decoded either simultaneously or successively. Simultaneous decoding of different streams yields a very high computational burden which grows exponentially in the total number of bits per channel use transmitted by all antennas 28. Therefore, simultaneous decoding is feasible only for small data rates as compared to the theoretical throughput. Here, we focus on the successive decoding schemes where each data stream is recovered by removing the data streams that have been recovered at earlier stages and by cancelling the remaining data streams, due to multiple receive antennas 40, via spatial (space-time or space-frequency) interference cancellation. Specifically, we consider schemes with ordered successive interference cancellation (OSIC).

A baseline system that makes use of the OSIC principle is disclosed in European Patent Application EP 0 951 091 A2. According to this known system, the total number of user bits 21 is demultiplexed into m symmetric streams 23. Each stream 23 undergoes an identical encoding (by encoders 24), modulation (by modulators 26) and is transmitted by one of m transmit antennas 28. A block diagram of such a transmitter 12 is shown in FIG. 4. The receiver 16 exploits M antennas 40 that produce M signal outputs. The receiver 16 applies the OSIC principle which is schematically shown in FIG. 6. It is assumed that the transfer function of the MIMO channel is known or accurately estimated at the receiver (e.g. due to the standard training procedure, based on the reference signals sent by the transmitter). This MIMO transfer function will be schematically described by an M×m matrix H whose entry $H_{q,p}$ stands for the transfer function between the p-th transmit antenna 28 and the q-th receive antenna 40. In frequency selective fading, the entries of H are functions representing either time domain or frequency domain characterisation of the channel. In non-selective (flat) fading environments, H has complex-valued entries.

The received encoded information subsignals are demodulated in demodulators 42. Based on the known H, the receiver 16 extracts the m streams (information subsignals) successively from the demodulated streams 41. At the first (leftmost) layer or stage (comprised of a MMSE canceller 44, a decoder 46, an encoder 48, multipliers 56 and subtractors 60), one of the streams 41 is extracted, by cancelling the contributions from the other (m−1) streams 41. Without loss of generality, assume that the index of the stream extracted at the first layer is $\pi[1]$. In the known system, a perfect cancellation of these streams is achieved due to projecting the vector $H_{\pi[1]} = [H_{1,\pi[1]}, \ldots, H_{M,\pi[1]}]^T$ (the superscript (T) stands for a matrix transpose) of channel transfer functions associated to this stream onto the part of the M-dimensional signal space which is orthogonal to the columns of the M×(m−1) matrix $[H_{1:M,\pi[2]}, \ldots, H_{1:M,\pi[m]}]$ representing the transfer functions of the other streams. The $\pi[1]$-th stream is a result of linear combining of signals from M antennas 40 with weights that are defined by the entries of the projected vector. This type of interference cancellation, known as zero-forcing, remains sub-optimal in the presence of noise. A better performance may be achieved with minimum mean square error (MMSE) cancellation (in MMSE canceller 44) which maximises the SINR. To apply MMSE extraction to the $\pi[1]$-th stream, we compute the m×M vector $$W_{\pi[1]}^{(1)} = (H_{\pi[1]}^*(\sigma_s^2 H H^* + \sigma_n^2 I_M)^{-1} H_{\pi[1]})^{-1} H_{\pi[1]}^* (\sigma_s^2 H H^* + \sigma_n^2 I_M)^{-1}, \quad (3)$$

where the superscript (*) stands for a matrix conjugate transpose, $I_M$ is the M×M identity matrix, $\sigma_s^2$ is the (average) power of every transmitted signal and $\sigma_n^2$ is the ambient noise power. The $\pi[1]$-th stream is a result of linear combining of signals from M antennas 40 with weights that are defined by the respective entries of $W_{\pi[1]}^{(1)}$. Whenever the ambient noise at different antennas is uncorrelated, MMSE cancellation results in the highest possible SINR:

$$SINR_{\pi[1]}^{(1)} = [(H_{\pi[1]}^*(\sigma_s^2 H H^* + \sigma_n^2 I_M)^{-1} H_{\pi[1]})^{-1} - 1]^{-1}. \quad (4)$$

The extracted $\pi[1]$-th stream 45 is forwarded by the MMSE canceller 44 to the decoder 46 which recovers the corresponding stream of user bits 47. These user bits 47 are encoded again by an encoder 48 to the sequence of channel symbols 49 which is scaled by the respective entries of the transfer function $H_{\pi[1]}$ (by means of multipliers 56) to produce the contributions of the $\pi[1]$-th stream to all M receiver branches. These contributions are extracted from the corresponding received signals by means of subtractors 60 as indicated in FIG. 6. The resulting M signals 55 are free of the contributions of the $\pi[1]$-th stream 45. The described procedure is applied recursively so that at the n-th layer/stage, a $\pi[n]$-th stream is extracted with certain $SINR_{\pi[n]}^{(n)}$, after the MMSE cancellation of the remaining (n−1) interfering streams by means of filter $W_{\pi[n]}^{(n)}$, its contribution is reconstructed and removed from the received signals, $1 \leq n \leq m$ (except for the last layer where the removal is not necessary). In FIG. 6 also the second layer/stage and the m-th layer/stage are shown. This second stage is comprised of MMSE canceller 50, decoder 52, encoder 54, multipliers 64 and subtractors 68. The m-th stage is only comprised of MMSE canceller 74 and decoder 76. The receiver 16 further comprises a multiplexer 72 which multiplexes the decoded information subsignals 47 of the m layers/stages into a information signal 77 comprising user bits.

The throughput of this MIMO transmission system depends on the set of SINR values $SINR_{\pi[1]}^{(1)}, \ldots, SINR_{\pi[m]}^{(m)}$. Hence, the order $\pi = \{\pi[n], 1 \leq n \leq m\}$ of the processing of m streams may be critical. To highlight the impact of the processing order on the system throughput, note that the symmetry of different subchannels and the absence of channel knowledge at the transmitter, yield equal transmission rates (throughputs) to be used for all subchannels. The overall throughput of such a system equals to m times the throughput of one subchannel. Finally, the throughput per subchannel is limited by the minimum of their respective throughputs which is defined by $\min\{SINR_{\pi[1]}^{(1)}, \ldots, SINR_{\pi[m]}^{(m)}\}$ The maximum throughput, therefore, corresponds to the maximum of min $\{SINR_{\pi[1]}^{(1)}, \ldots, SINR_{\pi[m]}^{(m)},\}$ whereas the optimal processing order is defined by such $\pi$ that maximises min $\{SINR_{\pi[1]}^{(1)}, \ldots, SINR_{\pi[m]}^{(m)}\}$. As shown in the above mentioned European Patent Application, the optimal processing order $\pi$ is achieved when, at every stage, the subchannel is selected that maximises the local SINR:

$$\pi[n] = \mathrm{argmax}_k\{SINR_k^{(n)}: 1 \leq k \leq m, k \neq \pi[p]: 1 \leq p < n\} 1 \leq n \leq m. \quad (5)$$

Figure 9:
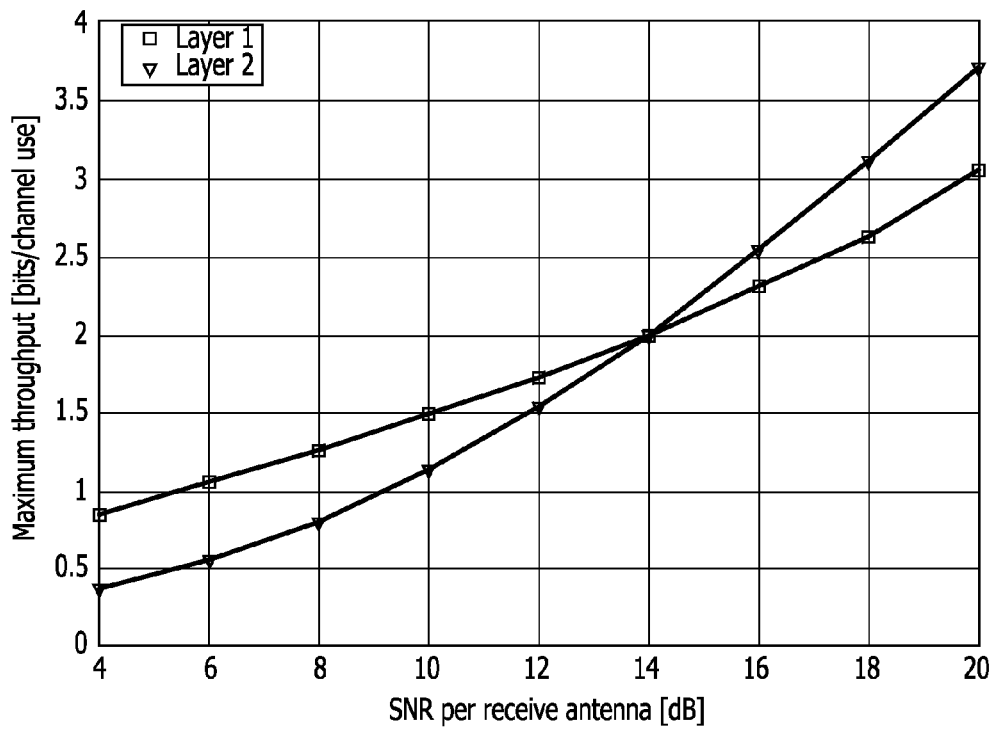
Figure 9:
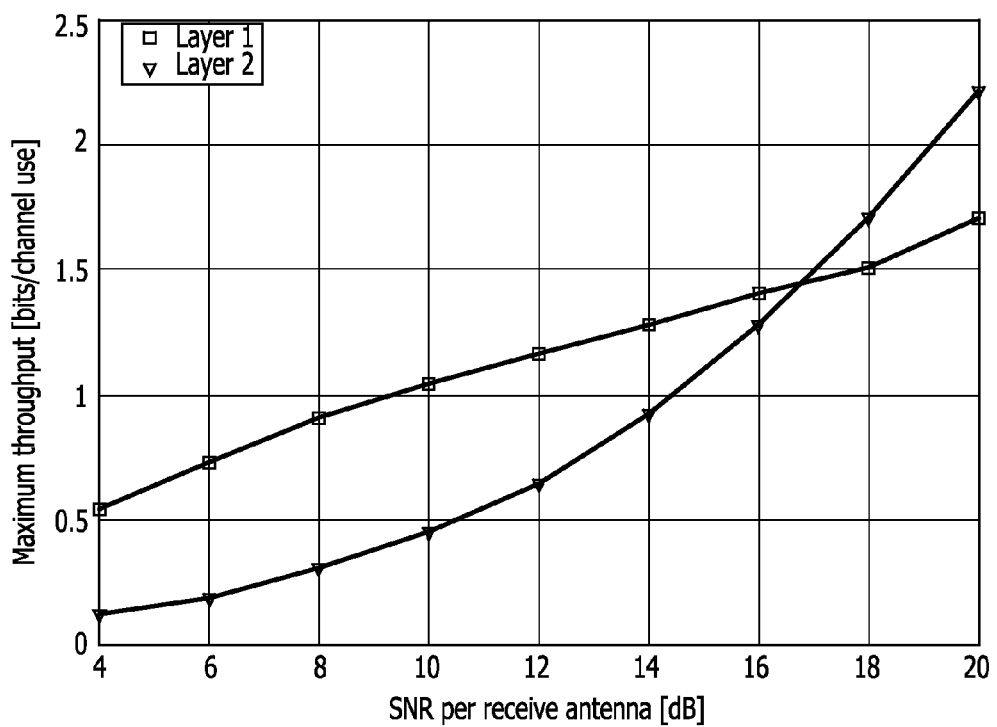

A MIMO transmission system as described earlier, with the transmitter 12 and receiver 16 as in FIG. 4 and FIG. 6 respectively, MMSE cancellation filters as specified by (3), decision statistics as defined by (4) and a processing order as defined in (5), is regarded in this document as the baseline system. Let us analyze a theoretically achievable throughput of such a system. We will assume a narrow-band (non-selective) Rayleigh fading channel with fully uncorrelated transmit/receive antennas. This means that the entries of the channel matrix are statistically independent complex Gaussian variables with zero mean and variance (½) per complex dimension. Let us first consider a system with two transmit/receive antennas: M=m=2. For this setup, the outage ratios $SINR_{\pi[1]}^{(1)}$ and $SINR_{\pi[2]}^{(2)}$ for both layers have been estimated from 100000 independent Monte-Carlo trials for a wide range of the overall SNR per receive antenna (i.e. ratio of the average total signal power from all transmit antennas to the noise power at any receive antenna). The empirical SINR values for the outage rates of 10% and 1% are plotted in FIG. 8 (showing outage SINR per layer/stage versus the overall SNR per receive antenna for outage rates 10% (upper frame) and 1% (lower frame), 2 transmit antennas, 2 receive antennas, uncorrelated Rayleigh fading). The corresponding outage values of capacities (maximum throughputs), computed according to the standard relationship, $$C=\log_2(1+SINR)[\text{bits/channel use}] \quad (6)$$

are plotted in FIG. 9 (showing outage throughput per layer/stage versus the overall SNR per receive antenna for outage rates 10% (upper frame) and 1% (lower frame), 2 transmit antennas, 2 receive antennas, uncorrelated Rayleigh fading). One can see that at small and moderate SNR, the first (leftmost) layer has a bigger throughput. Such a behaviour comes from the fact that at low SNR, the additive noise contribution is dominant within the mixture of the noise and residual interference and therefore the selection of the best subchannel, available at the first layer, results in a better capacity of this layer. The residual interference becomes more important along with the increase of SNR which explains the degradation of the first layer compared to the second layer at high SNR. The advantage of the first layer over the second layer also depends on the designed outage rate. Note that the maximum throughput of the first layer is nearly 2 times as big as the throughput of the second layer in some cases of practical interest. Namely, the region of SNR around 6-8 dB, outage rate 10% and less may be relevant for cellular communications in interference-limited environments, e.g. CDMA.

Figure 10:
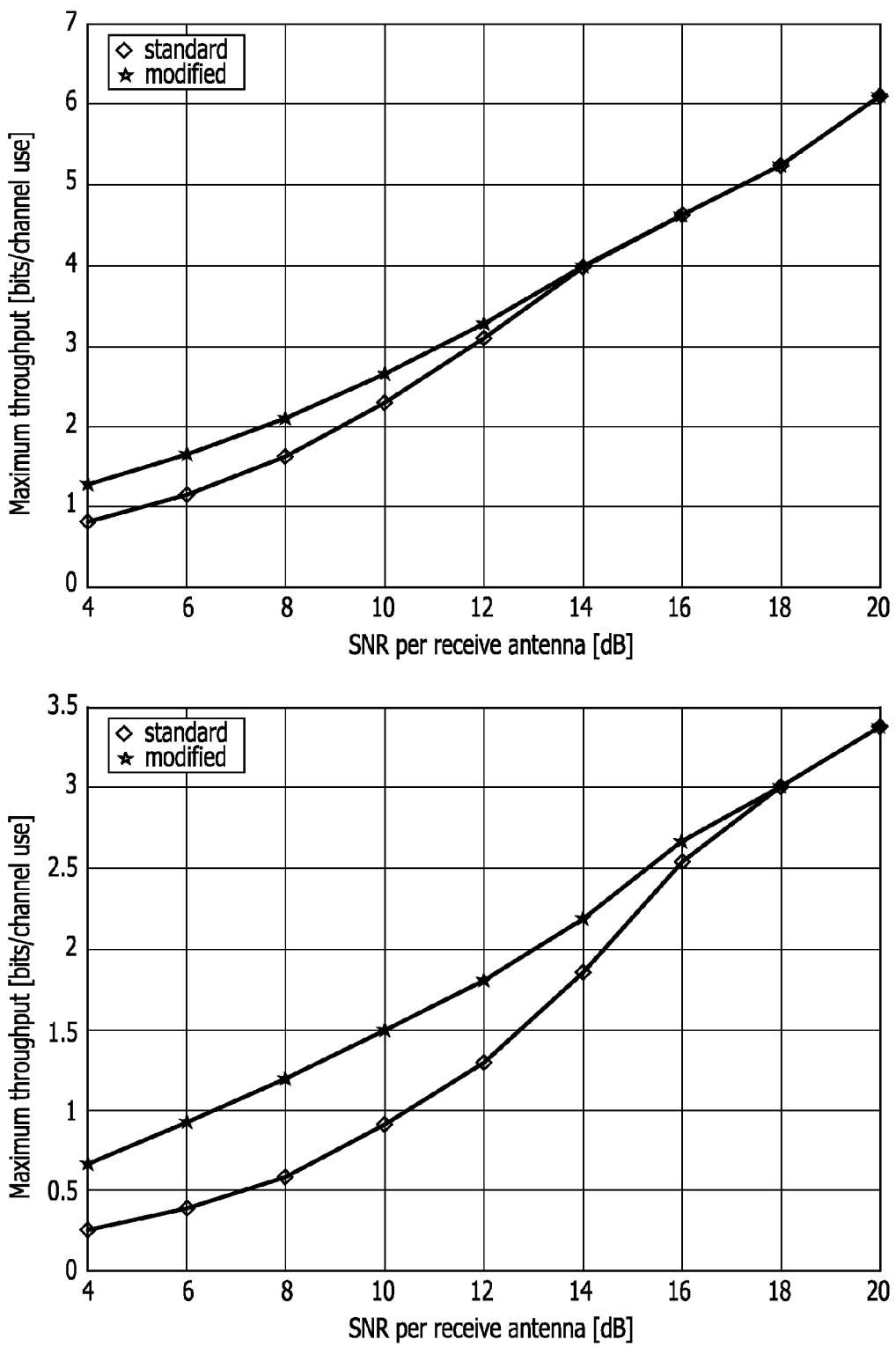

As explained earlier in this section, the throughput of each subchannel within the baseline system may not exceed the minimum of throughputs observed at different layers. Therefore, the maximum total throughput of the baseline system is twice the minimum of these throughputs. A 'diamond' curve of FIG. 10 shows the overall throughput of the baseline (standard) system versus the overall SNR for the outage rates of 10% (upper frame) and 1% (lower frame).

At this point, we note that the overall throughput may be increased up to the sum of the throughputs $C_1$ and $C_2$ of the two layers in the region of SNR and outage rates where $C_1 \geq C_2$. Indeed, one may notice that the transmission system with a transmitter 12 as in FIG. 4 and a receiver 16 as in FIG. 6 is a particular case of the general transmission scheme of FIG. 2 where the capacities $C_1 \ldots C_m$ stand for the outage throughputs achievable at layers 1 through m respectively while the permutation $\pi$ defines the processing order of the transmitted streams. The set of outage throughputs $C_1 \ldots C_m$ is defined by the statistical description of the assumed propagation environment (in our example, uncorrelated Rayleigh fading). Usually, these throughputs are measured off-line and may be assumed known to the transmitter 12 and to the receiver 16. The permutation $\pi$ depends on the channel realisation. This permutation is defined at the receiver 16, subject to the estimated channel matrix, and is therefore unknown to the transmitter 12. Hence, the baseline transmission system falls under the general scheme as depicted in FIG. 2 and therefore the general channel coding principle described above applies in this case. In a case of two transmit/receive antennas, the encoding may be performed as explained above. Let us design the encoder that has to operate in presence of uncorrelated Rayleigh fading at SNR of 8 dB and 10% outage rate. In this case, the throughputs achievable at layers 1 and 2 are $C_1 \approx 1.27$ and $C_2 \approx 0.81$ user bits per channel use respectively, see FIG. 9. The practically achievable throughputs of this layers are, therefore, upper-bounded by $C_1$ and $C_2$. These upper bounds are never achieved in practice since a (small) fraction of the spectral efficiency has to be sacrificed in order to satisfy the QoS requirements in terms of error rates. This fraction depends on the desired features of FEC and QoS requirements. The definition of practical throughput relates to the FEC design which is not addressed specifically in this document. Therefore, we will assume in this example an ideal FEC so that the maximum throughputs are achievable. Suppose that a block of data to be transmitted makes use of N=100 channel uses. This may correspond to e.g. to a block of 100 symbols of certain alphabet serially sent over the channel. According to the description in section 1, we have to form two sets of user bits of equal sizes $NC_1 \approx 127$ so that these sets share $N(C_1-C_2) \approx 127-81=46$ user bits. These two sets are independently encoded, modulated and transmitted via different antennas. At the receiver 16, the standard OSIC extraction of the data streams is performed, as described earlier in this section. According to the processing order $\pi$ which is determined at the receiver via (5), the stream or $\pi[1]$ is extracted at the first (leftmost) layer. Since the outage throughput of this layer is $C_1$, the corresponding $NC_1 \approx 127$ user bits may be successfully decoded. Recall that 46 of these user bits are shared with the stream $\pi[2]$. At the second layer, the stream or $\pi[2]$ is extracted. The decoder of this stream benefits from the knowledge of 46 user bits out of the total 127 bits. The remaining $NC_2=81$ user bits may be successfully recovered since the throughput of the second layer is $C_2 \approx 0.81$.

Note that the proposed channel coding scheme results in the overall throughput $(C_1+C_2) \approx 2.08$ bits per channel use which is a 28% improvement as compared to the baseline system with the overall throughput of $2C_2 \approx 1.62$ bits per channel use. The throughputs of baseline system and the proposed modification of this latter are plotted in FIG. 10 for various SNR and outage rates of 10% and 1%. The improvement of the modified transmission system over the baseline systems varies from 10% to 100% and even higher, at low and moderate SNR.

In the general case of M and m, the transmitter of the modified baseline system looks like in FIG. 5 wherein the Algorithm 1 is applied to generate m intersecting sets of user bits. These sets are encoder, modulated and transmitted in parallel, via m transmit antennas. The receiver of the modified baseline system is presented in FIG. 7. As compared to the conventional receiver in FIG. 6, the modified receiver contains a selection block 78 that controls via gates 80 the transfer of the shared user bits (the corresponding hard/soft decisions) decoded at earlier layers to the decoders of the following layers.

Figure 11:
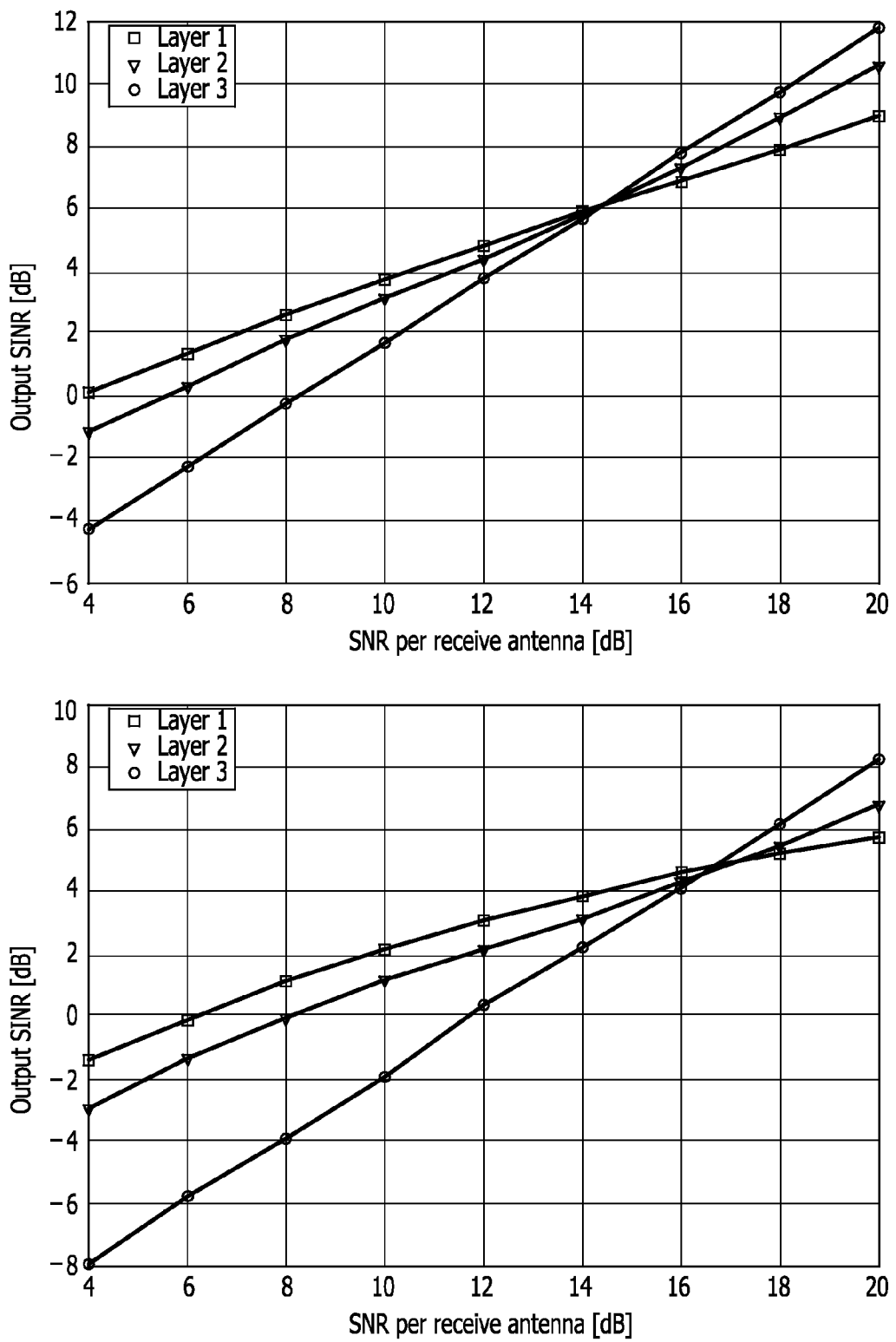
Figure 12:
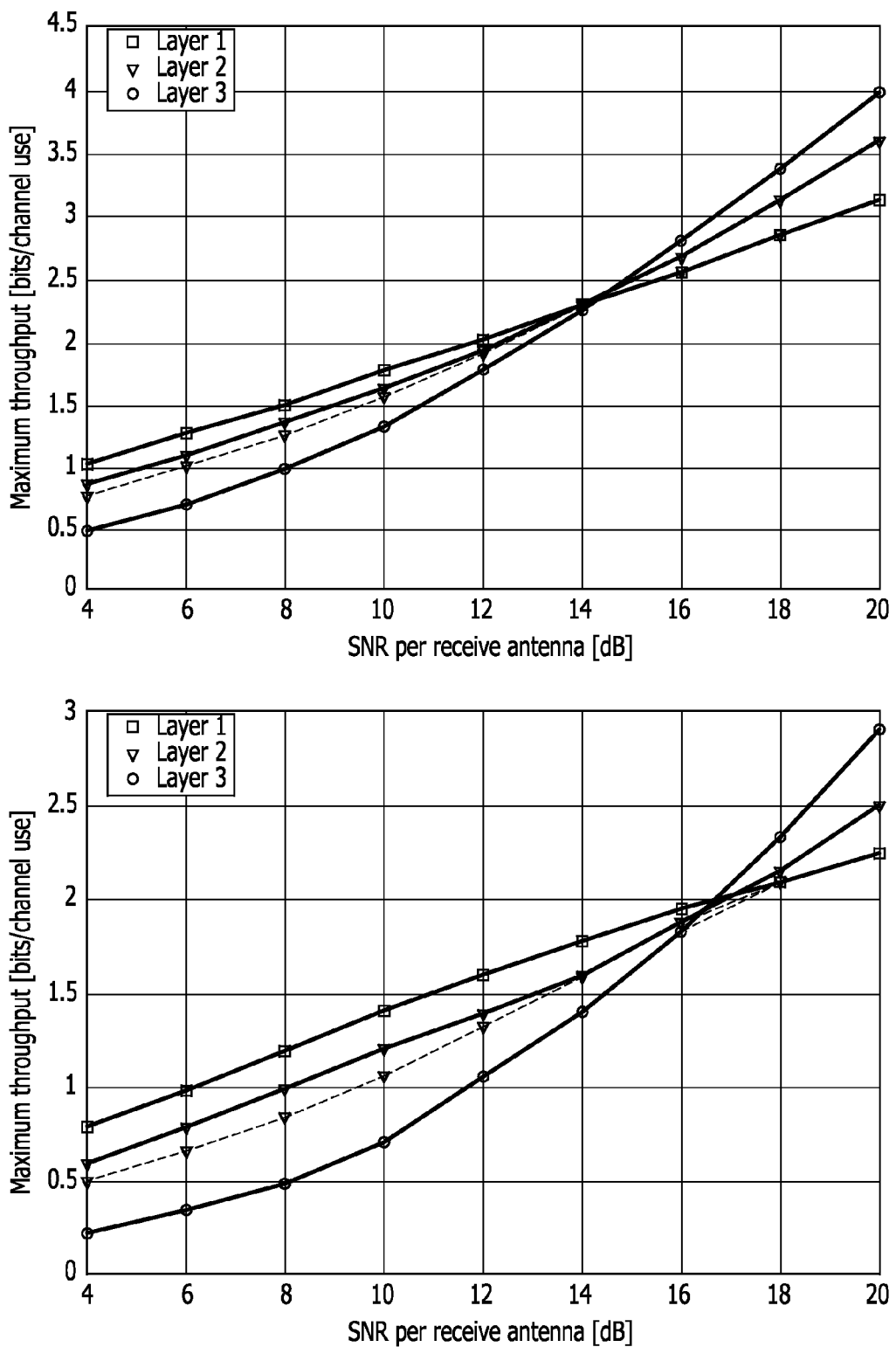
Figure 13:
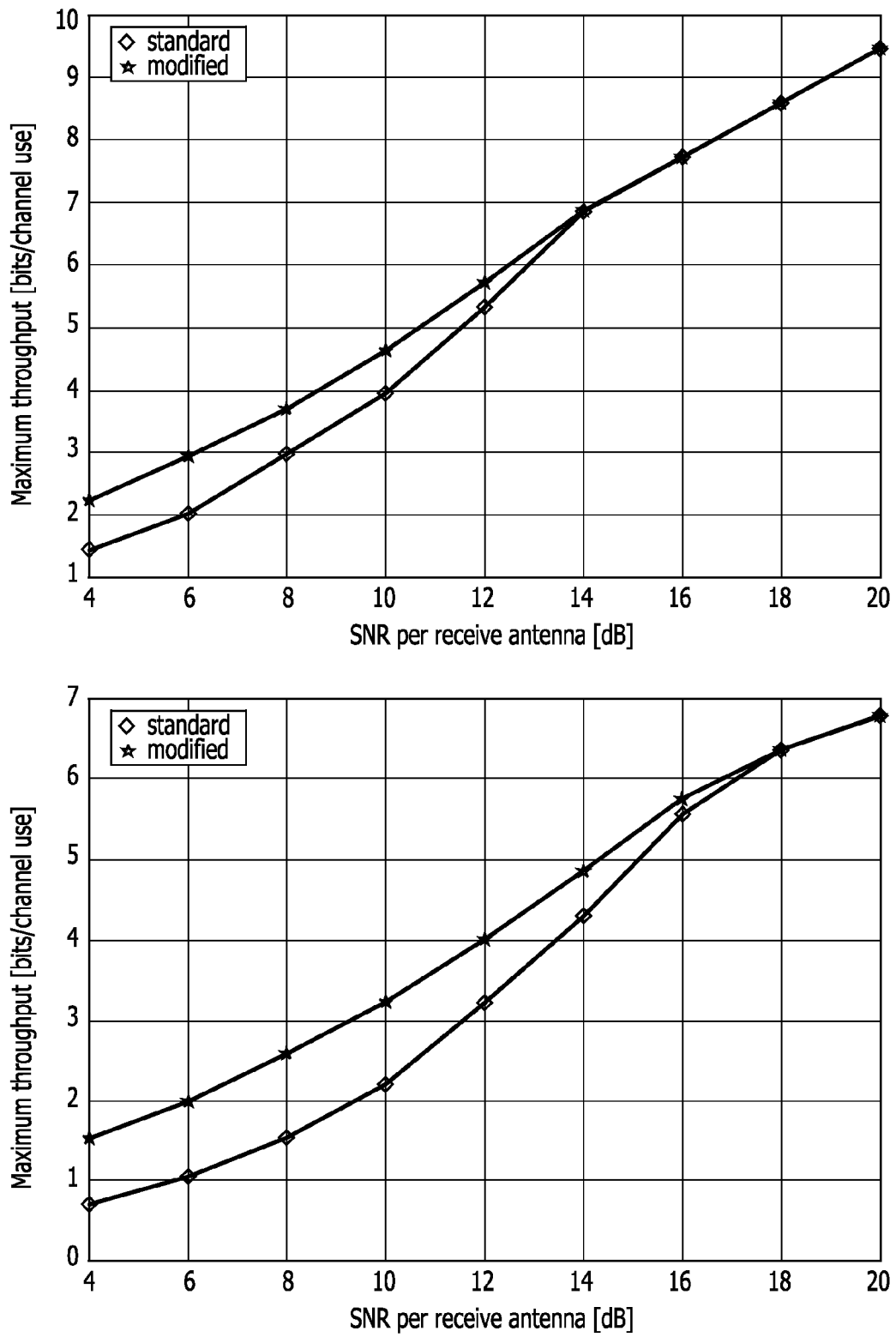

In the remainder, we give a slightly more complex example of user bit partitioning by means of the UBP algorithm, for a MIMO transmission system with M=m=3. Under the assumption of uncorrelated Rayleigh fading, we computed the outage SINR achievable at different layers, the corresponding outage throughputs per layer and the outage overall throughputs of the baseline (standard) and modified systems, for a wide range of SNR and outage rates 10% and 1%, see FIGS. 11 to 13. FIG. 11 shows the outage SINR per layer/stage versus the overall SNR per receive antenna for outage rates 10% (upper frame) and 1% (lower frame), the transmission system having 3 transmit antennas, 3 receive antennas and uncorrelated Rayleigh fading. FIG. 12 shows the outage throughput per layer/stage versus the overall SNR per receive antenna for outage rates 10% (upper frame) and 1% (lower frame), the transmission system having 3 transmit antennas, 3 receive antennas and uncorrelated Rayleigh fading. FIG. 13 shows the outage total throughput of the standard and the modified system versus the overall SNR per receive antenna for outage rates 10% (upper frame) and 1% (lower frame), the transmission system having 3 transmit antennas, 3 receive antennas and uncorrelated Rayleigh fading.

First of all, we need to find the set of maximum throughputs $\underline{C}_1, \underline{C}_2, \underline{C}_3$ that deliver the overall throughput $C_\Sigma$ under feasibility constrains, as indicated in (2). The resulting values $\underline{C}_1, \underline{C}_2, \underline{C}_3$ are plotted in FIG. 12 by dashed lines. Note that $\underline{C}_1=C_1$ and $\underline{C}_3=C_3$ in all cases whereas the middle layer throughput $\underline{C}_2$ is often smaller than the corresponding $C_2$. As earlier, we select SNR of 8 dB, 10% outage rate and N=100 channel uses per block. From FIG. 12, we find the maximum throughputs per layer $C_1 \approx 1.51$, $C_2 \approx 1.33$, $C_3 \approx 0.95$ and the maximum feasible throughputs per layer $\underline{C}_1 \approx 1.51$, $\underline{C}_2 \approx 1.23$, $\underline{C}_3 \approx 0.95$. Next, we apply the Algorithm 1 to generates three sets of user bits. First of all, we compute $N\underline{C}_1 \approx 151$, $N\underline{C}_2 \approx 123$, $N\underline{C}_3 \approx 95$ and the corresponding $D_1 = N\underline{C}_1 = 151$, $D_2 = (N\underline{C}_1 - N\underline{C}_2) = 28$, $D_3 = ((N\underline{C}_1 - N\underline{C}_2) - (N\underline{C}_2 - N\underline{C}_3)) = 0$. The remaining part of the Algorithm 1 may be implemented as follows:

choose $I_1$ as an arbitrary set of $D_1=151$ user bits;

take the first block of $D_2=28$ bits (bits 1 through 28) from $I_1$, obtain $I_2$ by appending $(D_1-D_2)=123$ user bits that are not in $I_1$;

take the second block of $D_2=28$ bits (bits 29 through 56) from $I_1$ (no intersection with $I_2$), append the second block of $D_2=28$ bits (bits 29 through 56) from $I_2$ (no intersection with $I_1$), append $((D_1-D_2)-(D_2-D_3))=95$ user bits that are not shared with $I_1$ and $I_2$, to obtain $I_3$.

Note that $D_3=0$ implies that the three sets of user bits to be built have an empty intersection. Let us make a more general observation. For any $m \geq 3$, whenever the throughputs $C_2 \ldots C_{m-1}$ lie above the straight line between $C_1$ and $C_m$, we have $\underline{C}_1 = C_1, \underline{C}_m = C_m$, and all $\underline{C}_1 \ldots \underline{C}_m$ are equally spaced along the (imaginary) straight line that connects $C_1$ and $C_m$. In this case, $D_n=0$ for all $m \geq 3$ and therefore any three (or more) sets of user bits have empty intersections. This observation may be used to simplify the general version of the UBP algorithm, by confining the inner loop to $p \in \{(n-3),(n-2),(n-1)\}$. This simplification may be valuable for moderate and big m.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A transmission system for transmitting an information signal via a plurality of subchannels from a transmitter to a receiver, the transmitter comprising
a demultiplexer for demultiplexing the information signal into a plurality of information subsignals,
a channel encoder for encoding the information subsignals into encoded information subsignals, wherein each encoded information subsignal is transmitted via one of the subchannels to the receiver, and the receiver comprising
a channel decoder for successively decoding the received encoded information subsignals,
wherein the demultiplexer demultiplexes the information signal into a plurality of partly overlapping information subsignals comprising shared and non-shared information elements, wherein for each subsignal a distribution of the shared information elements is based on a capacity of the subchannels as ordered by the receiver, and
wherein the channel decoder decodes a received encoded information subsignal by incorporating shared information elements of already decoded information subsignals.

2. The transmission system is according to claim 1, wherein the demultiplexer demultiplexes the information signal into the plurality of partly overlapping information subsignals according to a user bit partitioning algorithm.

3. The transmission system according to claim 1, wherein the transmitter further comprises an interleaver coupled between the demultiplexer and the channel encoder, the interleaver interleaving the information subsignals, wherein the channel encoder encodes the interleaved information subsignals into the encoded information subsignals.

4. The transmission system according to claim 1, wherein the channel decoder decodes a received encoded information subsignal by incorporating shared information elements of the most recently decoded information subsignal.

5. The transmission system according to claim 1, wherein the transmission system is a binary transmission system and wherein the information subsignals comprise differently routed binary signals.

6. The transmission system according to claim 1, wherein the transmission system is a wireless communication system, and wherein the transmitter comprises a plurality of transmit antennas, wherein each encoded information subsignal is transmitted via one of the transmit antennas to the receiver, and wherein the receiver comprises a plurality of receive antennas for receiving the encoded information subsignals.

7. A transmitter for transmitting an information signal via a plurality of subchannels to a receiver, the transmitter comprising
a demultiplexer for demultiplexing the information signal (21) into a plurality of information subsignals; and
a channel encoder for encoding the information subsignals into encoded information subsignals,
wherein each encoded information subsignal is transmitted via one of the subchannels to the receiver, and
wherein the demultiplexer demultiplexes the information signal into a plurality of partly overlapping information subsignals comprising shared and non-shared information elements, wherein for each subsignal a distribution of the shared information elements is based on a capacity of the subchannels as ordered by the receiver.

8. The transmitter according to claim 7, wherein the demultiplexer demultiplexes the information signal into the plurality of partly overlapping information subsignals according to a user bit partitioning algorithm.

9. The transmitter according to claim 7, wherein the transmitter further comprises an interleaver coupled between the demultiplexer and the channel encoder, the interleaver interleaving the information subsignals, wherein the channel encoder encodes the interleaved information subsignals into the encoded information subsignals.

10. The transmitter according to claim 7, wherein the transmitter comprises a plurality of transmit antennas, and wherein each encoded information subsignal is transmitted via one of the transmit antennas to the receiver.

11. A receiver for receiving encoded information subsignals via a plurality of subchannels from a transmitter, the receiver comprising
    a channel decoder for successively decoding the received encoded information subsignals,
    wherein the encoded information subsignals are partly overlapping encoded information subsignals comprising shared and non-shared information elements,
    wherein for each subsignal a distribution of the shared information elements is based on a capacity of the subchannels as ordered by the receiver, and
    wherein the channel decoder decodes a received encoded information subsignal by incorporating shared information elements of already decoded information subsignals.

12. The receiver according to claim 11, wherein the channel decoder decodes a received encoded information subsignal by incorporating shared information elements of the most recently decoded information subsignal.

13. The according to claim 11, wherein the receiver comprises a plurality of receive antennas for receiving the encoded information subsignals.

14. A method of transmitting an information signal via a plurality of subchannels to a receiver, the method comprising:
    demultiplexing the information signal into a plurality of information subsignals,
    encoding the information subsignals into encoded information subsignals,
    transmitting each encoded information subsignal via one of the subchannels to the receiver, wherein the information signal is demultiplexed into a plurality of partly overlapping information subsignals comprising shared and non-shared information elements, and wherein for each subsignal a distribution of the shared information elements is based on a capacity of the subchannels as ordered by the receiver.

15. The method of transmitting according to claim 14, wherein the information signal is demultiplexed into the plurality of partly overlapping information subsignals according to a user bit partitioning algorithm.

16. The method of transmitting according to claim 14, the method further comprising interleaving the information subsignals, wherein the interleaved information subsignals are encoded into the encoded information subsignals.

17. The method of transmitting according to claim 14, wherein the encoded information subsignals are transmitted via a plurality of transmit antennas to the receiver.

18. A method of receiving encoded information subsignals via a plurality of subchannels from a transmitter, the method comprising:
    successively decoding the received encoded information subsignals,
    wherein the encoded information subsignals are partly overlapping encoded information subsignals comprising shared and non-shared information elements, a received encoded information subsignal being decoded by incorporating shared information elements of already decoded information subsignals, and wherein for each subsignal a distribution of the shared information elements is based on a capacity of the subchannels as ordered by the receiver.

19. The method of receiving according to claim 18, wherein a received encoded information subsignal is encoded by incorporating shared information elements of the most recently decoded information subsignal.

20. The method of receiving according to claim 18, wherein the encoded information subsignals are received via a plurality of receive antennas.

* * * * *